(12) United States Patent
Yamasaki et al.

(10) Patent No.: US 7,662,288 B2
(45) Date of Patent: Feb. 16, 2010

(54) WATER TREATMENT METHOD AND WATER TREATMENT SYSTEM

(75) Inventors: Kazuyuki Yamasaki, Hiroshima (JP);
Kazuyuki Sakata, Fukuyama (JP);
Kazumi Chuhjoh, Takamatsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 465 days.

(21) Appl. No.: 11/528,699

(22) Filed: Sep. 28, 2006

(65) Prior Publication Data
US 2007/0095751 A1 May 3, 2007

(30) Foreign Application Priority Data
Sep. 28, 2005 (JP) .............................. 2005-281639

(51) Int. Cl.
*C02F 3/00* (2006.01)
(52) U.S. Cl. ....................... 210/620; 210/631; 210/220; 210/150; 210/151
(58) Field of Classification Search ................ 210/620, 210/631, 220, 150–151
See application file for complete search history.

(56) References Cited

U.S. PATENT DOCUMENTS 6,946,073 B2 * 9/2005 Daigger et al. .............. 210/605

2004/0176649 A1 * 9/2004 Takahashi et al. ............. 585/15

FOREIGN PATENT DOCUMENTS

| JP | 2003-251384 | 9/2003 |
| JP | 2003-334548 | 11/2003 |
| JP | 2004-121962 | 4/2004 |
| JP | 2004-237144 | 8/2004 |
| JP | 2004-321959 | 11/2004 |

* cited by examiner

*Primary Examiner*—Chester T Barry
(74) *Attorney, Agent, or Firm*—Nixon & Vanderhye P.C.

(57) ABSTRACT

In a water treatment system, micro-nano bubbles are used in a production device and a detoxification device as one example of the upstream treatment devices which perform specified treatment with use of water. The micro-nano bubbles are used again in the waste water treatment by a waste water pretreatment device and a waste water treatment device in the subsequent step. Since the micro-nano bubbles are reused, the efficiency of the micro-nano bubbles can be enhanced. Moreover, according to the waste water pretreatment device, treatment water is pretreated with the microorganisms activated by micro-nano bubbles and propagating in a polyvinylidene chloride filler material and then it is introduced into the waste water treatment device in the subsequent step. Thereby it is possible to reduce the waste water treatment load in the waste water treatment device in the subsequent step.

17 Claims, 5 Drawing Sheets

Fig. 4

WATER TREATMENT METHOD AND WATER TREATMENT SYSTEM

CROSS-REFERENCE TO RELATED APPLICATIONS

This nonprovisional application claims priority under 35 U.S.C. §119(a) on Patent Application No. 2005-281,639 filed in Japan on 28 Sep. 2005, the entire contents of which are incorporated herein by reference.

BACKGROUND OF THE INVENTION

The present invention relates to a water treatment method and a water treatment system, and relates to, as an example, a water treatment method and a water treatment system for the entire plant including production devices. The present invention also relates to, as an example, a water treatment method and a water treatment system in which air micro-nano bubbles and nitrogen micro-nano bubbles are effectively generated to be used inside the plant as well as to be used in pretreatment of treatment water in waste water treatment. The present invention also relates to, as an example, a water treatment system and a water treatment method relating to the entire plant in which treatment water containing micro-nano bubbles is pretreated before being introduced into a waste water treatment device so that the efficiency of the waste water treatment device is considerably enhanced, by which the entire waste water treatment device can be downsized and the quality of treated water can be increased.

In the water treatment methods and water treatment devices, some methods and devices have conventionally been present as general pretreatment methods and pretreatment devices.

For example, the treatments performed by a pretreatment device in a biological treatment device include settling, filtration, pH control, ozone oxidation and absorption. The purpose of the pretreatment device is to reduce biological, chemical or physical loads of a water treatment device in the subsequent step, and therefore, downsizing of the water treatment device, reduction in running costs, increase in water quality of treated water coming from the water treatment device and the like can be expected.

However, the action by the conventional pretreatment does not implement a function to considerably increase the dissolved oxygen concentration in the treatment water and to sustain the dissolved oxygen concentration for a long period of time till the subsequent step nor a function to considerably increase the dissolved oxygen concentration in the treatment water and to dramatically enhance the reaction efficiency. In a word, the action does not go much beyond general aeration as pretreatment by a blower.

Moreover, a method and a device for using nano bubbles have been disclosed in JP 2004-121962 A as prior art.

It has been disclosed in this prior art to utilize characteristics such as a surface activity effect and a sterilization effect by implementation of the decrease of buoyancy, the increase of a surface area, the intensification of surface activity, the generation of a local high pressure field, and electrostatic polarization in the nano bubbles. More specifically, it has been disclosed that with mutual association of the characteristics, it becomes possible to clean various objects with a high function and a low environmental load and to purify polluted water by the function to adsorb pollution components as well as by the function of high speed cleaning and sterilization of object surfaces.

Further, a method for generating nano air bubbles as another prior art has been disclosed in JP 2003-334548 A.

In this prior art, it has been disclosed that the method is composed of a process (1) for decomposing a part of liquid into gas in the liquid, a process (2) for applying ultrasonic waves in the liquid or processes (3) for decomposing a part of liquid into gas and for applying ultrasonic waves.

With research and development of the effects and the functions of the micro-nano bubbles being conducted, methods and devices for effectively generating and effectively using micro-nano bubbles are being demanded.

BRIEF SUMMARY OF THE INVENTION

An object of the present invention is to provide a water treatment method and a water treatment system allowing effective use of micro-nano bubbles.

To achieve the above-mentioned object, the present invention provides a water treatment method, comprising:

a first step for introducing micro-nano bubbles into at least one of a plurality of upstream treatment devices which perform specified treatment with use of water; and a second step for applying specified pretreatment to treatment water coming from the upstream treatment devices before introducing the treatment water into a downstream waste water treatment device.

According to the water treatment method in the present invention, micro-nano bubbles are used in at least one of a plurality of the upstream treatment devices which perform specified treatment with use of water. Then, after a specified pretreatment is applied to treatment water coming from the upstream treatment devices, the treatment water is introduced into a downstream waste water treatment device. Thus, the micro-nano bubbles are used again in the downstream waste water treatment device which treats the treatment water coming from the upstream treatment devices. Therefore, according to the water treatment method, the micro-nano bubbles are reused, by which the water treatment method can achieve effective use of micro-nano bubbles. This kind of reuse can be achieved because nano bubbles included in the micro-nano bubbles can exist in the treatment water for as a long period as one month or more. It should be noted that, as used herein, the treatment water is defined as water to be treated or treatment-receiving water.

In one embodiment of the present invention, the treatment water coming from the upstream treatment devices is replenished with micro-nano bubbles in the second step.

According to the water treatment method of the embodiment, the treatment water coming from the upstream treatment devices is turned into the treatment water containing a specified amount of micro-nano bubbles (an amount necessary for waste water treatment in the waste water treatment device for example) before being introduced into the downstream waste water treatment device.

In one embodiment of the present invention, the micro-nano bubbles are at least one of air micro-nano bubbles and nitrogen micro-nano bubbles.

According to the water treatment method of the embodiment, when the micro-nano bubbles are air micro-nano bubbles, aerobic microorganisms are activated so as to promote biological treatment with aerobic microorganisms. When the micro-nano bubbles are nitrogen micro-nano bubbles, anaerobic microorganisms are activated so as to promote biological treatment with anaerobic microorganisms.

The present invention also provides a water treatment system, comprising:

a plurality of upstream treatment devices for performing specified treatment with use of water;

a micro-nano bubble introduction device for introducing micro-nano bubbles into at least one of a plurality of the upstream treatment devices; and a waste water pretreatment device for receiving treatment water coming from the upstream treatment devices and applying specified pretreatment to the treatment water before introducing the treatment water into a waste water treatment device in a subsequent step.

According to the water treatment system of the present invention, the waste water pretreatment device applies pretreatment to the treatment water containing micro-nano bubbles coming from the upstream treatment devices before introducing the treatment water into the waste water treatment device in the subsequent step. Therefore, in the waste water treatment device in the subsequent step, it is no longer necessary to prepare a device for generating micro-nano bubbles while it becomes possible to reduce the treatment load in the waste water treatment device in the subsequent step due to the pretreatment performed in the waste water pretreatment device, by which the waste water treatment device in the subsequent step can be downsized.

Moreover, micro-nano bubbles are used in the treatment devices (production devices and detoxification devices for example) which perform specified treatment with use of water, and the micro-nano bubbles are used again in the waste water treatment by the waste water pretreatment device as well as by the waste water treatment device in the subsequent step. Since the micro-nano bubbles are reused, the efficiency of the micro-nano bubbles can be enhanced.

In one embodiment of the present invention, the waste water pretreatment device replenishes the treatment water introduced from the upstream treatment devices with micro-nano bubbles.

According to the water treatment system of the embodiment, treatment water can be introduced into the waste water treatment device in the subsequent step after a specified amount of micro-nano bubbles (a specified amount effective for waste water treatment in the waste water treatment device in the subsequent step for example) are added into the treatment water.

In one embodiment of the present invention, the upstream treatment devices include a production device in plant or a detoxification device in plant, and wherein the micro-nano bubble introduction device includes an air micro-nano bubble generation section or a nitrogen micro-nano bubble generation section.

According to the water treatment system of the embodiment, supplying air micro-nano bubbles generated by the air micro-nano bubble generation section to the detoxification device allows enhancement of the detoxification efficiency by the detoxification device. It is also desirable to supply nitrogen micro-nano bubbles generated by the nitrogen micro-nano bubble generation section to production devices for use in the production devices where dissolved oxygen is often unwelcome.

In one embodiment of the present invention, the nitrogen micro-nano bubble generation section adds nitrogen micro-nano bubbles into ultrapure water from an ultrapure water making device before introducing the water containing. nitrogen micro-nano bubbles into the generation device, and wherein the air micro-nano bubble generation section adds air micro-nano bubbles into pretreated processing water coming from a pretreatment device, which pretreats industrial water, before introducing the water containing air micro-nano bubbles into the detoxification device.

According to the water treatment system of the embodiment, nitrogen micro-nano bubbles are used for such objects as ultrapure water and production devices which dislike dissolved oxygen, so that the micro-nano bubbles can aid the treatment in the production device, while air micro-nano bubbles are used for pretreated processing water and detoxification devices, by which the detoxification efficiency can be enhanced.

In one embodiment of the present invention, the waste water pretreatment device receives: treatment water containing air micro-nano bubbles and nitrogen micro-nano bubbles coming from the upstream treatment devices; biologically treated water; and makeup water containing air micro-nano bubbles, and comprises a micro-nano bubble treatment tank filled with a polyvinylidene chloride filler material.

According to the water treatment system of the embodiment, the micro-nano bubble treatment tank is filled with a polyvinylidene chloride filler material, so that intense pretreatment of waste water is implemented by active microorganisms propagating in the polyvinylidene chloride filler material.

In one embodiment of the present invention, the waste water pretreatment device comprises an air micro-nano bubble replenishing tank for introducing makeup water containing air micro-nano bubbles into the micro-nano bubble treatment tank.

According to the water treatment system of the embodiment, in the air micro-nano bubble replenishing tank, it becomes possible to easily check the generation state of the air micro-nano bubbles in makeup water so as to return optimum air micro-nano bubbles to the micro-nano bubble treatment tank. Moreover, the optimum air micro-nano bubbles can be introduced from the micro-nano bubble treatment tank into the waste water treatment device in the subsequent step. Moreover, since two separate tanks, the micro-nano bubble treatment tank and the air micro-nano bubble replenishing tank, are provided, the air micro-nano bubble replenishing tank is set to be smaller than the micro-nano bubble treatment tank so that in the air micro-nano bubble replenishing tank, the generation state of the air micro-nano bubbles can easily be checked. For example, by forming a part of the tank wall of the air micro-nano bubble replenishing tank from a transparent material, the generation state of the air micro-nano bubbles in the replenishing tank can easily be checked with the unassisted eye.

In the case where the generation state of the air micro-nano bubbles in the air micro-nano bubble replenishing tank is poor, the amount of air taken to a micro nano bubble generator can be adjusted, for example, by an air flow rate adjustment valve 8 so as to optimize the generation state of the micro-nano bubbles.

In one embodiment of the present invention, the waste water treatment device in the subsequent step has a biological treatment device.

According to the water treatment system of the embodiment, the treatment water which has been introduced into the biological treatment device included in the waste water treatment device in the subsequent step contains micro-nano bubbles, so that the treatment by the biological reaction can be intensified.

In one embodiment of the present invention, the waste water treatment device in the subsequent step has a chemical treatment device.

According to the water treatment system of the embodiment, the treatment water which has been introduced into the chemical treatment device included in the waste water treatment device in the subsequent step contains micro-nano bubbles, so that the micro-nano bubbles exhibit a catalytic action upon a chemical reaction, thereby making it possible to intensify the treatment by the chemical reaction.

In one embodiment of the present invention, the waste water treatment device in the subsequent step has a physical treatment device.

According to the water treatment system of the embodiment, the treatment water which has introduced into the physical treatment device included in the waste water treatment device in the subsequent step contains micro-nano bubbles, so that a physical reaction can be increased.

In one embodiment of the present invention, the air micro-nano bubble replenishing tank receives treatment water coming from the micro-nano bubble treatment tank and has a micro-nano bubble generator, and the waste water pretreatment device further comprises a biological treatment tank or a deep biological treatment tank having a submerged membrane and receiving treatment water coming from the air micro-nano bubble replenishing tank.

According to the water treatment system of the embodiment, the treatment water containing air micro-nano bubbles and nitrogen micro-nano bubbles is introduced into a biological treatment tank or a deep biological treatment tank having a submerged membrane. Consequently, in the biological treatment tank or the deep biological treatment tank, the activity of microorganisms can be increased by the air micro-nano bubbles, while the activity of anaerobic microorganisms can be increased by the nitrogen micro-nano bubbles.

In the viewpoint of energy saving, the deep biological treatment tank is more effective than the general biological treatment tank. More specifically, in treatment water containing air micro-nano bubbles and nitrogen micro-nano bubbles, micro bubbles accumulate in treatment water for only four to five minutes, whereas nano bubbles accumulate in treatment water for a month and therefore even without the oxygen feeding process by aeration, dissolved oxygen can be maintained for a long time due to the effect by the air micro-nano bubbles.

In one embodiment of the present invention, in the first step or the second step, the nitrogen micro-nano bubbles are introduced into a biological reaction tank having anaerobic microorganisms to increase activity of the anaerobic microorganisms so that the nitrogen micro-nano bubbles are used in microbial treatment.

According to the water treatment method of the embodiment, the nitrogen micro-nano bubbles activate anaerobic microorganisms, so that the efficiency of microbial treatment with the anaerobic microorganisms in the biological reaction tank can be enhanced. The microbial treatment with anaerobic microorganisms in the biological reaction tank is applicable not only to the general waster water treatment but also to the field of fermentation and brewing as well as to the filed of human waste treatment.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The invention will hereinbelow be described in detail in conjunction with the preferred embodiments with reference to the drawings.

First Embodiment

Figure 1:
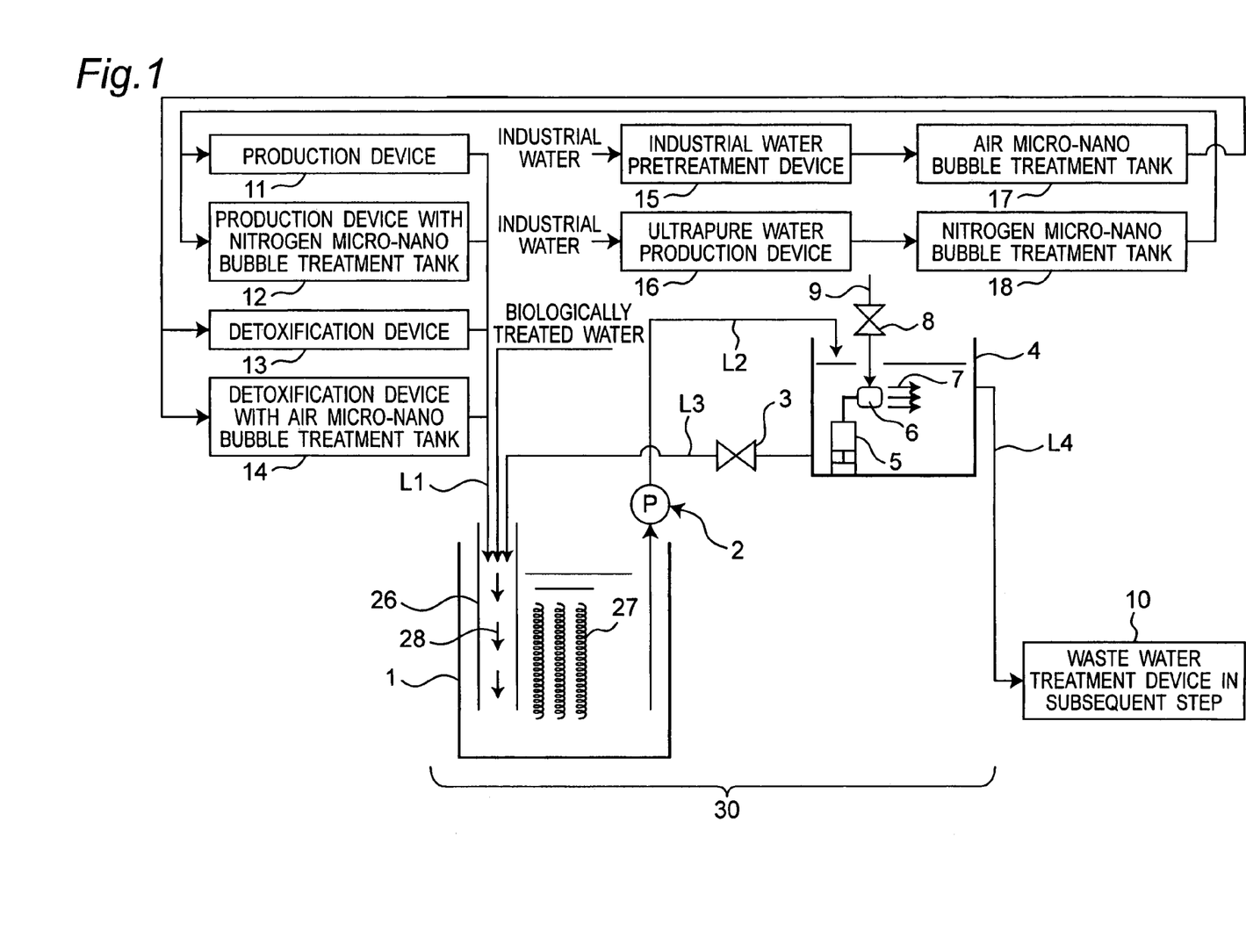
FIG. 1 is a schematic view showing a water treatment system in a first embodiment of the present invention.

FIG. 1 is a schematic view showing a water treatment system in a first embodiment of the present invention. The water treatment system in the first embodiment is composed of a production device 11, a production device with nitrogen micro-nano bubble treatment tank 12, a detoxification device 13, and a detoxification device with air micro-nano bubble treatment tank 14 as an upstream water treatment device. The water treatment system in the first embodiment also has, as the upstream water treatment devices, a industrial water pretreatment device 15 and an ultrapure water production device 16, into which industrial water is introduced. The water treatment system in the first embodiment also has an air micro-nano bubble treatment tank 17 and a nitrogen micro-nano bubble treatment tank 18 as micro-nano bubble introduction devices.

The water treatment system in the first embodiment also has a waste water pretreatment device 30, which has a filler-type air micro-nano bubble treatment tank 1 and an air micro-nano bubble replenishing tank 4.

In the water treatment system in the first embodiment, first, treatment water is introduced into a pipe L1 from each of the production device 11, the production device with nitrogen micro-nano bubble treatment tank 12, the detoxification device 13, and the detoxification device with air micro-nano bubble treatment tank 14. Then, from the pipe L1, the treatment water is introduced into the upper side of a lower introduction pipe 26 included in the filler-type air micro-nano bubble treatment tank 1, and then the treatment water is introduced from the lower side of the lower introduction pipe 26 into the lower side of the air micro-nano bubble treatment tank 1.

The production device 11 and the production device with nitrogen micro-nano bubble treatment tank 12 introduce treatment water containing nitrogen micro-nano bubbles to the pipe L1. Also, the detoxification device 13 and the detoxification device with air micro-nano bubble treatment tank 14 introduce treatment water containing air micro-nano bubbles to the pipe L1.

The treatment water containing nitrogen micro-nano bubbles and air micro-nano bubbles is introduced into the air micro-nano bubble treatment tank 1 from the lower introduction pipe 26.

Second, biologically treated water containing salt is introduced into the air micro-nano bubble treatment tank 1 from the lower introduction pipe 26.

Third, treatment water replenished with air micro-nano bubbles in the air micro-nano bubble replenishing tank 4 is introduced into the air micro-nano bubble treatment tank 1 from the lower introduction pipe 26.

Moreover, the inside of the air micro-nano bubble treatment tank 1 is filled with a polyvinylidene chloride filler material 27. Microorganisms, which propagate in the polyvinylidene chloride filler material 27 with the salt in the biologically treated water as a source of nutrition, is activated by the air micro-nano bubbles, as a result of which pretreatment of the treatment water is achieved.

In the upstream side, industrial water is introduced into the ultrapure water production device 16 to produce ultrapure water, which is in turn introduced into the subsequent nitrogen micro-nano bubble treatment tank 18 so that new ultrapure water containing nitrogen micro-nano bubbles is produced. The new ultrapure water containing nitrogen micro-nano bubbles is introduced into the production device 11 or the production device with nitrogen micro-nano bubble treatment tank 12 to be used therein.

The ultrapure water already contains nitrogen micro-nano bubbles as it has traveled through the nitrogen micro-nano bubble treatment tank 18. However, as in the production device with nitrogen micro-nano bubble treatment tank 12, using the nitrogen micro-nano bubbles generated inside the production device allows the nitrogen micro-nano bubbles to have a higher cleaning effect. Therefore, in the case of needing the higher cleaning effect, the production device with nitrogen micro-nano bubble treatment tank 12 should be employed.

Then, the treatment water containing nitrogen micro-nano bubbles is introduced into the filler-type air micro-nano bubble treatment tank 1 from the production device 11 and the production device with nitrogen micro-nano bubble treatment tank 12.

In the upstream side, industrial water is introduced into the industrial water pretreatment device 15, where pretreated water is produced. The pretreated water is introduced into the subsequent air. micro-nano bubble treatment tank 17, where new pretreated water containing air micro-nano bubbles is produced. The new pretreated water containing air micro-nano bubbles is introduced into the detoxification device 13 or the detoxification device with air micro-nano bubble treatment tank 14, where the new pretreated water is used for enhancement of the detoxification efficiency.

The reason why the detoxification device with air micro-nano bubble treatment tank 14 is present is similar to the reason why the nitrogen micro-nano bubble treatment tank 12 is present. More specifically, using the air micro-nano bubbles generated inside the detoxification device allows the air micro-nano bubbles to have a higher detoxification effect.

Then, the treatment water containing air micro-nano bubbles is introduced into the filler-type air micro-nano bubble treatment tank 1 from the detoxification device 13 and the detoxification device with air micro-nano bubble treatment tank 14.

The treatment water pretreated in the filler-type air micro-nano bubble treatment tank 1 is introduced into the air micro-nano bubble replenishing tank 4 through a pipe L2 by a pump 2. A submerged pump 5 and a micro-nano bubble generator 6 are mounted in the air micro-nano bubble replenishing tank 4. The micro-nano bubble generator 6 is connected to an air suction pipe 9. The air flow rate adjustment valve 8 mounted on the air suction pipe 9 is set at an appropriate opening so that an appropriate amount of air and treatment water from the control circuit 5 can be supplied to the micro-nano bubble generator 6. Thus, the micro-nano bubble generator 6 can generate appropriate micro-nano bubbles. It is to be noted that reference numeral 7 denotes water flow in FIG. 1.

The treatment water containing air micro-nano bubbles in the air micro-nano bubble replenishing tank 4 is partially returned to the air micro-nano bubble treatment tank 1 through a pipe L3 and a valve 3. As a result, the air micro-nano bubble treatment tank 1 is replenished with air micro-nano bubbles.

The treatment water containing air micro-nano bubbles in the air micro-nano bubble replenishing tank 4 is introduced into the waste water treatment device 10 in the subsequent step through a pipe L4. The air micro-nano bubbles contained in the treatment water enhance the waste water treatment function in the waste water treatment device 10 in the subsequent step and thereby increase the waste water treatment efficiency.

The treatment water introduced into the waste water treatment device 10 in the subsequent step from the pipe L4 also contains nitrogen micro-nano bubbles. The nitrogen micro-nano bubbles contained in the treatment water are introduced into the waste water treatment device 10 in the subsequent step so as to enhance the waste water treatment function in the waste water treatment device 10 in the subsequent step. More specifically, the nitrogen micro-nano bubbles increase the activity of anaerobic microorganisms in the waste water treatment device 10 in the subsequent step, by which the efficiency of chemical treatment and physical treatment can be improved.

Any commercially available generator by any manufacturer may be used for the micro-nano bubble generator 6. The generators made by Nanoplanet Research Institute Corporation were employed in the present embodiment. As other available products, there are a micro-nano bubble generator by Nomura Electric Industries Co., Ltd, a micro-nano bubble generator by Aura Tec Co., Ltd., a micro-nano bubble generator by Seika Corp. and a micro-nano bubble generator by Shigen Kaihatsu K. K. The generator should be selected from these products depending on the purpose.

Description is now given of three kinds of bubbles.

(i) Normal bubbles ascend in water, and upon reaching the surface, they burst with a pop and disappear.

(ii) Micro bubbles, which are microscopic bubbles with a diameter of not more than 50 μm, shrink in water and eventually disappear (totally dissolved).

(iii) Nano bubbles, which are bubbles smaller than the micro bubbles (with a diameter of not more than 1 μm: 100 nm to 200 nm), are said to be able to exist in water permanently. The micro nano bubbles can be defined as the bubbles with the micro bubbles and the nano bubbles mixed together.

Thus, according to the waste water pretreatment device 30 in the present embodiment, treatment water is pretreated with the microorganisms activated by micro-nano bubbles so as to propagate in the polyvinylidene chloride filler material 27 and then the treatment water is introduced into the waste water treatment device 10 in the subsequent step, so that a waste water treatment load in the waste water treatment device 10 in the subsequent step can be reduced.

Moreover, in the water treatment system in the first embodiment, micro-nano bubbles are used in the production devices 11, 12 and the detoxification devices 13, 14 as one example of the upstream treatment devices which perform specified treatment with use of water, and the micro-nano bubbles are used again in the waste water treatment by the waste water pretreatment device 30 and the waste water treatment device 10 in the subsequent step. Since the micro-nano bubbles are reused, the efficiency of the micro-nano bubbles can be enhanced.

Second Embodiment

Figure 2:
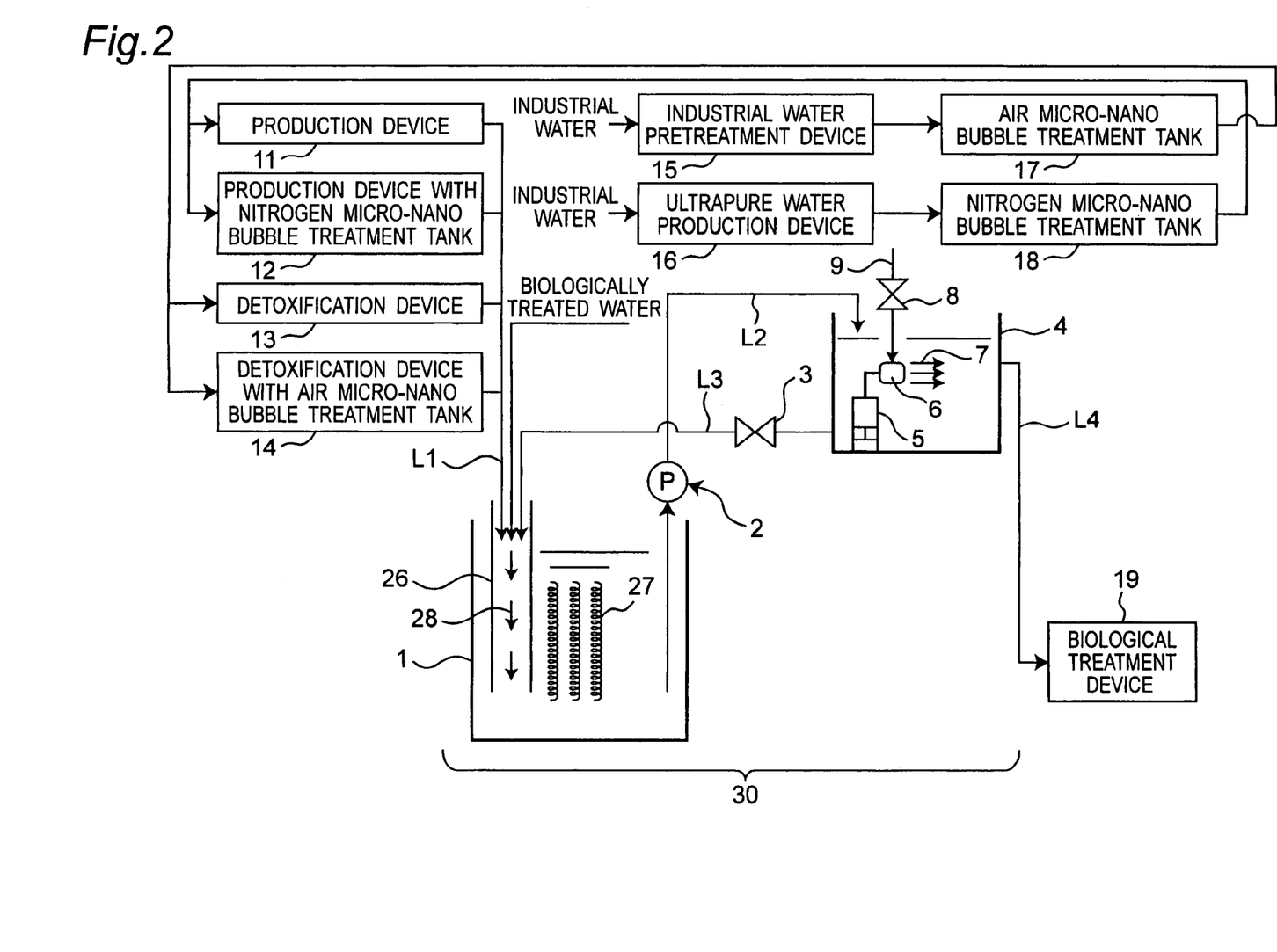
FIG. 2 is a schematic view showing a water treatment system in a second embodiment of the present invention.

FIG. 2 shows a water treatment system in a second embodiment of the present invention. In the second embodiment, the waste water treatment device 10 in the subsequent step in the first embodiment is replaced with a biological treatment device 19. Accordingly, in the second embodiment, the component members identical to those in the first embodiment are designated by identical reference numerals, and their detailed description is omitted while the difference from the first embodiment will mainly be described.

In the second embodiment, the treatment water which has been pretreated with micro-nano bubbles by the waste water pretreatment device 30 as in the first embodiment is introduced into a biological treatment device 19. This makes it possible to minimize the load of the biological treatment device 19 and to downsize the biological treatment device 19. In other words, the treatment water is pretreated with micro-nano bubbles and the treatment water with the micro-nano bubbles added thereinto is introduced into the biological treatment device 19, so that the microorganisms propagating in the biological treatment device 19 can be activated by micro-nano bubbles.

Moreover, since nano bubbles are said to exist in treatment water for a month or more, they dissolve in treatment water, as a result of which the dissolved oxygen is sustained in the biological treatment device 19, and this makes it possible to save, for example, the air amount for aeration in the biological treatment device 19.

As a concrete example, it is possible to install and use the filler-type air micro-nano bubble treatment tank 1 and the air micro-nano bubble replenishing tank 4 as the waste water pretreatment device 30 for the biological treatment device 19 which treats waste developers as waste water of a semiconductor plant.

It is to be noted that in the biological treatment device 19 for treating waste developers, there are a case where a typical combination of an aeration tank and a settling tank is selected and a case of a waste developer treatment system with only an aeration tank using a submerged membrane without a settling tank. In either case, the filler-type air micro-nano bubble treatment tank 1 and the air micro-nano bubble replenishing tank 4 are adoptable.

Third Embodiment

Figure 3:
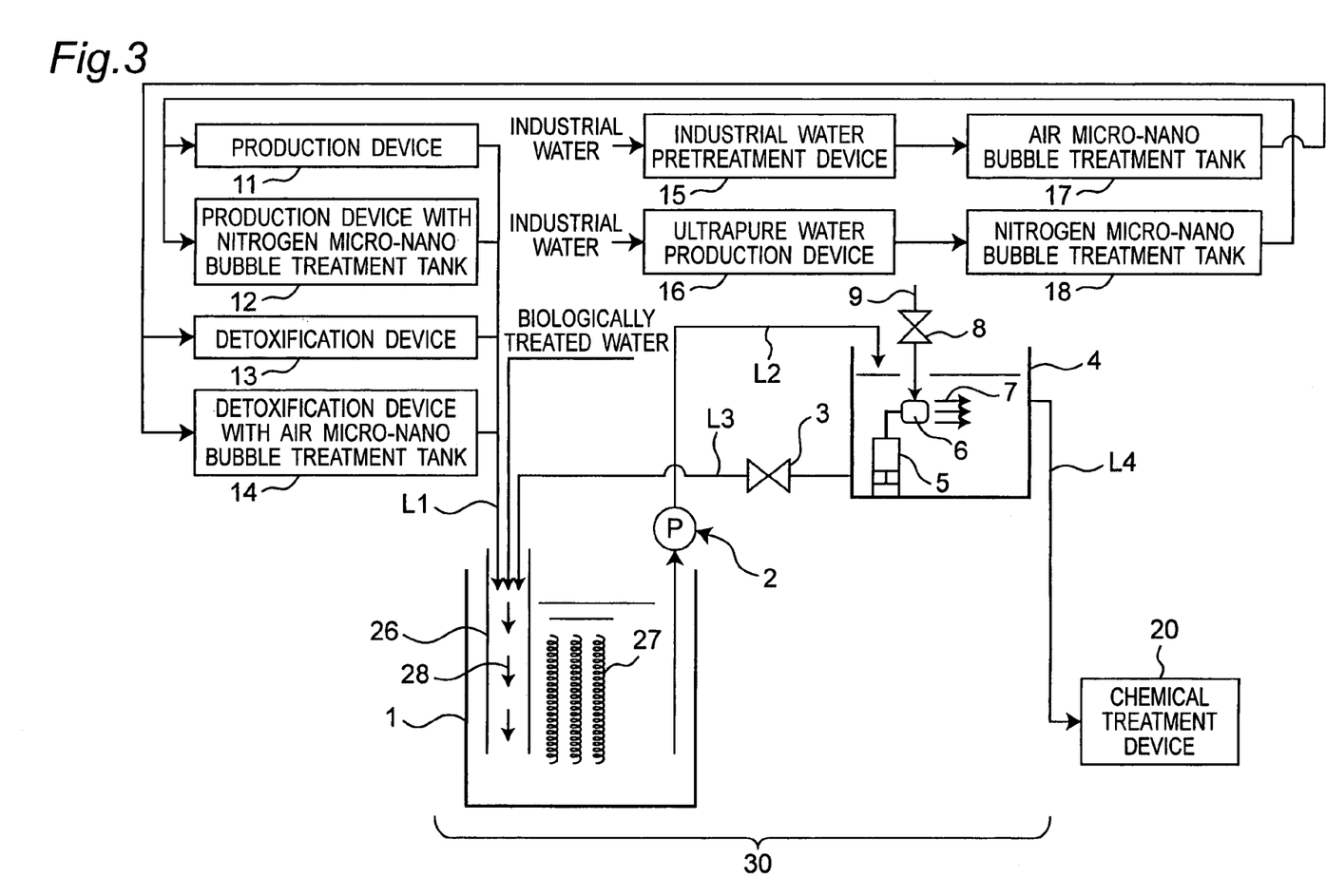
FIG. 3 is a schematic view showing a water treatment system in a third embodiment of the present invention.

FIG. 3 shows a water treatment system in a third embodiment of the present invention. In the third embodiment, the waste water treatment device 10 in the subsequent step in the first embodiment is replaced with a chemical treatment device 20. Accordingly, in the third embodiment, the component members identical to those in the first embodiment are designated by identical reference numerals, and their detailed description is omitted while the difference from the first embodiment will mainly be described.

In the third embodiment, the treatment water which has been pretreated with micro-nano bubbles by the waste water pretreatment device 30 as in the first embodiment is introduced into the chemical treatment device 20. Consequently, the micro-nano bubbles exhibit a catalytic action upon the chemical reaction in the chemical treatment device 20, thereby making it possible to promote the chemical reaction more than usual. The micro-nano bubbles act upon the chemical reaction in a catalytic way. It is said that the micro-nano bubbles in treatment water continuously exist only for a several minutes in treatment water, whereas nano bubbles exist in treatment water for a month or more. Therefore, the micro-nano bubbles effectively act to promote the chemical reaction in the chemical treatment device 20.

The concrete examples of the chemical treatment device 20 include a chemical treatment device for treating fluorinated acid waste water as waste water of a semiconductor plant. In this case, the fluorinated acid in the fluorinated acid waste water is treated by addition of calcium hydroxide (slaked lime) to chemically form calcium fluoride. Micro-nano bubbles are effective for promoting the chemical reaction.

Fourth Embodiment

Figure 4:
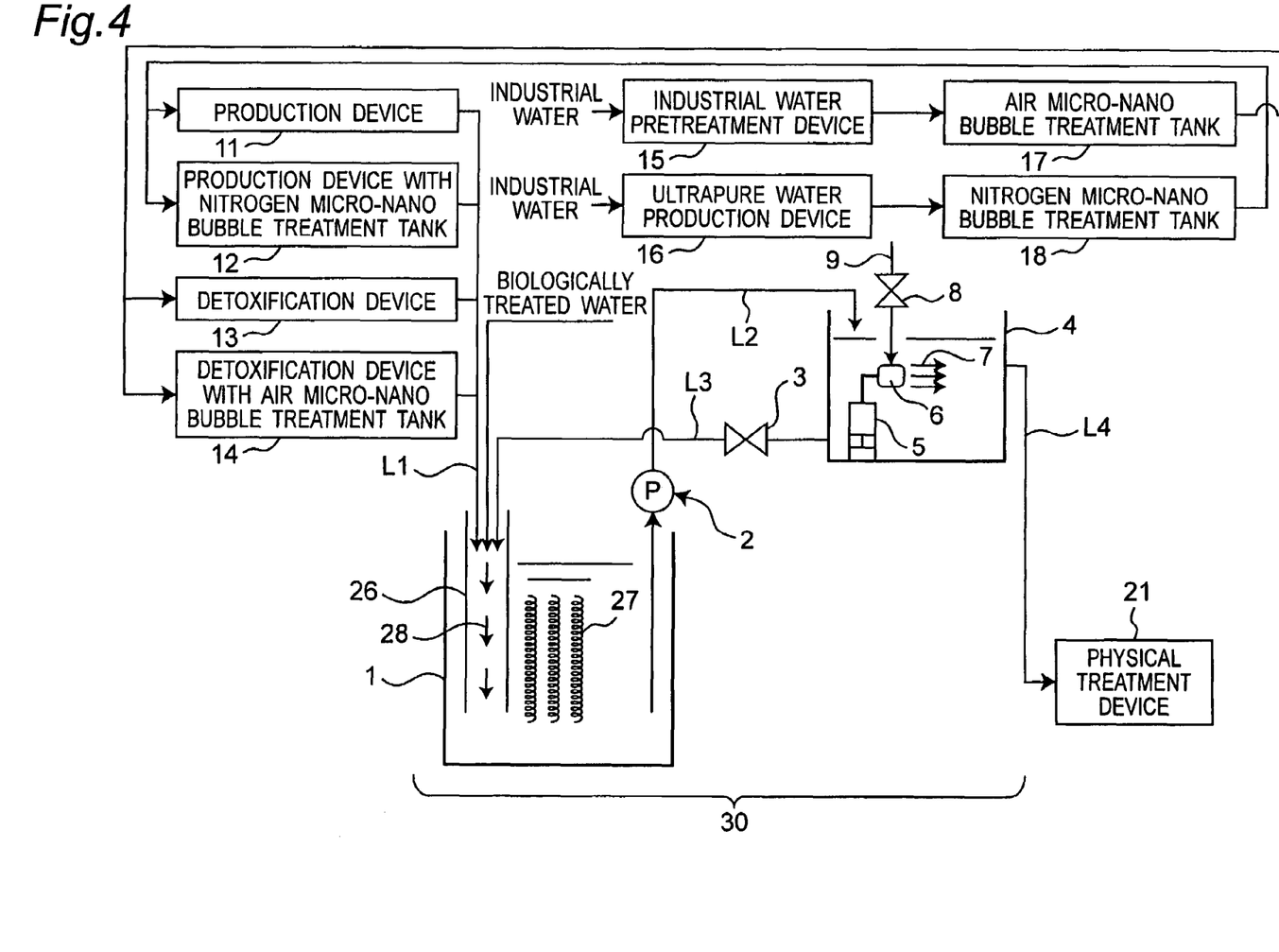
FIG. 4 is a schematic view showing a water treatment system in a fourth embodiment of the present invention.

FIG. 4 shows a water treatment system in a fourth embodiment of the present invention. In the fourth embodiment, the waste water treatment device 10 in the subsequent step in the first embodiment is replaced with a physical treatment device 21. Accordingly, in the fourth embodiment, the component members identical to those in the first embodiment are designated by identical reference numerals, and their detailed description is omitted while the difference from the first embodiment will mainly be described.

In the fourth embodiment, the treatment water which has been pretreated with micro-nano bubbles by the waste water pretreatment device 30 as in the first embodiment is introduced into a physical treatment device 21. Consequently, the micro-nano bubbles act in the physical treatment in the physical treatment device 21 so that the load of the physical treatment can be reduced. One example of the actions of the micro-nano bubbles is the action to adsorb pollution components in liquid.

For example, a rapid filter and the like as one example of the physical treatment device 21 has a clogging phenomenon caused by organic substances. The adsorbing action of the micro-nano bubbles can decrease the clogging caused by organic substances as pollution of the rapid filter, which makes it possible to reduce the number of back washing of the rapid filter per unit period. Moreover, since the pollution components in treatment water can be adsorbed and treated with micro-nano bubbles, the replacement frequency of a filter material in the rapid filter can be reduced.

According to the fourth embodiment, therefore, it becomes possible to reduce the load of the physical treatment device 21 installed after the filler-type air micro-nano bubble treatment tank 1 and the air micro-nano bubble replenishing tank 4.

Fifth Embodiment

Figure 5:
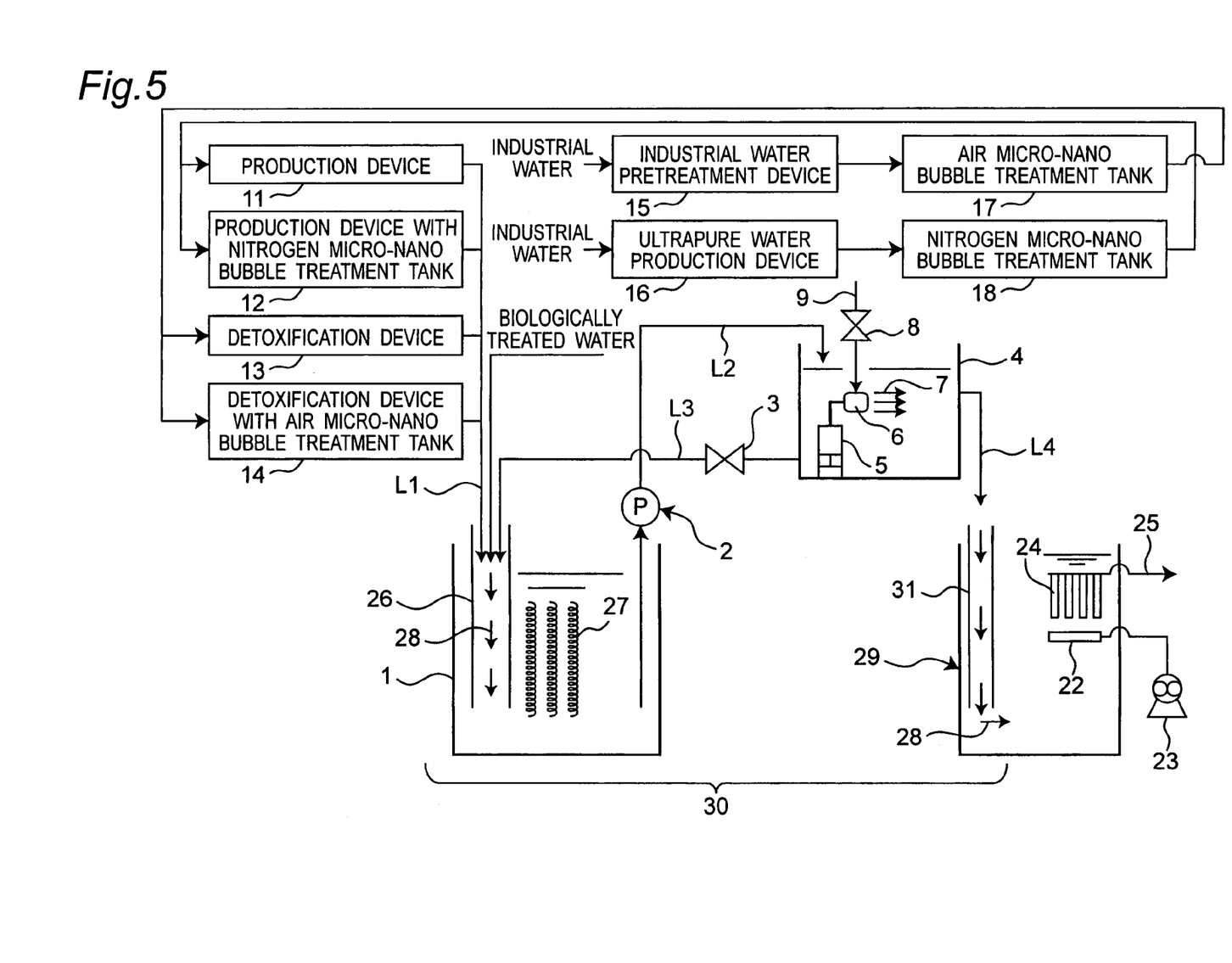
FIG. 5 is a schematic view showing a water treatment system in a fifth embodiment of the present invention.

FIG. 5 shows a water treatment system in a fifth embodiment of the present invention. In the fifth embodiment, the waste water treatment device 10 in the subsequent step in the first embodiment is replaced with a deep biological treatment tank 29. Accordingly, in the fifth embodiment, the component members identical to those in the first embodiment are designated by identical reference numerals, and their detailed description is omitted while the difference from the first embodiment will mainly be described.

As shown in FIG. 5, the deep biological treatment tank 29 has a lower introduction pipe 26 positioned in the end of the tank for introducing the treatment water coming from the pipe L4 into the lower side of the deep biological treatment tank 29 by natural force (gravity). The deep biological treatment tank 29 has a submerged membrane 24 and a gravity pipe 25 positioned in the end of the deep biological treatment tank 29 opposite to the lower introduction pipe 26. With the submerged membrane 24 and the gravity pipe 25, treatment water is effectively treated. It is to be noted that the gravity pipe 25 is a pipe for introducing treatment water by gravity (water head difference).

The deep biological treatment tank 29, which is composed of a submerged membrane cleaning blower 23 and a diffusing pipe 22 for air-washing the submerged membrane 24, air-washes the submerged membrane 24 with the air discharged from the diffusing pipe 22. As a result, the treatment capability in the submerged membrane 24 can be maintained stable.

In the fifth embodiment, the treatment water which has been pretreated with micro-nano bubbles by the waste water pretreatment device 30 as in the first embodiment is introduced into the deep biological treatment tank 29. It is to be noted that the deep biological treatment tank 29 may be replaced with a biological treatment tank.

Since the treatment water with micro-nano bubbles added thereinto by the filler-type air micro-nano bubble treatment tank 1 and the air micro-nano bubble replenishing tank 4 is introduced into the deep biological treatment tank 29, aerobic microorganisms propagating in the deep biological treatment tank 29 are activated, resulting in enhancement of the treatment capability. Particularly, since the treatment water containing micro-nano bubbles is considerably higher in resolvability of persistent chemical substances in treatment water than the treatment water having no micro-nano bubble, the treatment efficiency is increased. The reason of the increased treatment efficiency is the activation of aerobic microorganisms by air micro-nano bubbles and the activation of anaerobic microorganisms by the nitrogen micro-nano bubbles.

EXPERIMENTAL EXAMPLE

An experimental device corresponding to the waste water pretreatment device 30 in the first embodiment shown in FIG. 1 was manufactured. The filler-type air micro-nano bubble treatment tank 1 in the experimental device had a capacity of 300 L, while the air micro-nano bubble replenishing tank 4 had a capacity of 80 L.

After a trial run of the experimental device for approx. two days, waste water discharged from a semiconductor plant was continuously introduced as treatment water into the filler-type air micro-nano bubble treatment tank 1 and the air micro-nano bubble replenishing tank 4. The measured dissolved oxygen concentration in the treatment water was 0 ppm. After three days for stabilization of water quality, the dissolved oxygen concentration in the treatment water was measured in an outlet pipe L4 of the air micro-nano bubble replenishing tank 4, and the result was 6 ppm.

Although in the above embodiment, air micro-nano bubbles and nitrogen micro-nano bubbles were adopted as micro-nano bubbles, micro-nano bubbles of other gas are also adoptable.

The invention being thus described, it will be obvious that the invention may be varied in many ways. Such variations are not be regarded as a departure from the spirit and scope of the invention, and all such modifications as would be obvious to one skilled in the art are intended to be included within the scope of the following claims.

The invention claimed is:

1. A water treatment method, comprising:
 a first step of introducing micro-nano bubbles of air or nitrogen into at least one of a plurality of upstream water treatment devices to produce treatment water; and
 a second step of pretreating said treatment water to produce pretreatment water and treating said pretreatment water in a downstream waste water treatment device.

2. The water treatment method according to claim 1, wherein
 the treatment water coming from the upstream water treatment devices is replenished with micro-nano bubbles in the second step.

3. A water treatment method, comprising:
 introducing micro-nano bubbles of air or nitrogen into industrial water to be treated to produce pretreatment water, and in a separate container treating said pretreatment water to treatment with microorganisms to produce treatment water,
 wherein the treatment with microorganisms does not include additional introduction of air into the separate container.

4. A water treatment system, comprising:
 a plurality of upstream treatment devices constructed and arranged to performing specified water treatment;
 a micro-nano bubble introduction device constructed and arranged to introduce air or nitrogen micro-nano bubbles into at least one of a plurality of the upstream treatment devices; and
 a waste water pretreatment device constructed and arranged to receiving treatment water coming from the upstream treatment devices and applying specified pretreatment to the treatment water before introducing the treatment water into a waste water treatment device in a subsequent step, wherein the pretreatment device is constructed and arranged to perform a microbiological treatment process in a treatment tank and the treatment tank does not allow for additional direct introduction of air or nitrogen into the device during the microbiological treatment process.

5. The water treatment system according to claim 4, wherein
 the system further comprises a recycle tank which is constructed and arranged to recycle the microbiologically treated water from the treatment tank through a micro-nano bubble.

6. The water treatment system according to claim 4, wherein
 the upstream treatment devices include a production device in plant or a detoxification device in plant.

7. The water treatment system according to claim 6, wherein the micro-nano bubble introduction device is constructed and arranged to introduce
 nitrogen micro-nano bubbles, when the system is in operation, in to ultrapure water from an ultrapure water making device before introducing the water containing nitrogen micro-nano bubbles into a production device, and
 a further micro-nano bubble introduction device is constructed and arranged to introduce
 air micro-nano bubbles when the system is in operation, in to pretreated processing water coming from a pretreatment device, which pretreats industrial water, before introducing the water containing air micro-nano bubbles into a detoxification device.

8. The water treatment system according to claim 4, wherein
 the treatment tank is constructed and arranged to contain a polyvinylidene chloride filler material, and, when the system is in operation, to receive the treatment water containing air micro-nano bubbles and nitrogen micro-nano bubbles coming from the upstream treatment devices, biologically treated water and makeup water containing air micro-nano bubbles.

9. The water treatment system according to claim 8, wherein
 the waste water pretreatment device further comprises an air micro-nano bubble replenishing tank constructed and arranged to introduce makeup water containing air micro-nano bubbles into the treatment tank.

10. The water treatment system according to claim 4, further comprising a biological treatment device constructed and arranged to perform the waste water treatment of the subsequent step.

11. The water treatment system according to claim 4, further comprising
a chemical treatment device constructed and arranged to perform the waste water treatment of the subsequent step.

12. The water treatment system according to claim 4, further comprising
a physical treatment device constructed and arranged to perform the waste water treatment of the subsequent step.

13. The water treatment system according to claim 9, wherein
the air micro-nano bubble replenishing tank is constructed and arranged to receive treatment water coming from the treatment tank the air micro-nano bubble replenishing tank including a micro-nano bubble generator, and
the waste water pretreatment device further comprises a biological treatment tank or a deep biological treatment tank having a submerged membrane, which is constructed and arranged to receive treatment water from the air micro-nano bubble replenishing tank.

14. The water treatment method according to claim 1, wherein
the nitrogen micro-nano bubbles are introduced and the pretreating comprises a biological reaction with anaerobic microorganisms in a separate biological reaction tank.

15. The method according to claim 3, further comprising an anaerobic microorganism treatment method when said micro-nano bubbles are nitrogen micro-nano bubbles.

16. The method of claim 3 further comprising treating the treatment water to further waste water treatment.

17. The method of claim 3 wherein at least a portion of said pretreatment water is recycled through a separate container wherein micro-nano bubbles of air or nitrogen are added to the pretreatment water.

* * * * *